United States Patent
Lee

(10) Patent No.: US 11,541,866 B2
(45) Date of Patent: Jan. 3, 2023

(54) SYSTEM AND METHOD OF CONTROLLING POWER DISTRIBUTION OF HYBRID ELECTRIC VEHICLE

(71) Applicants: Hyundai Motor Company, Seoul (KR); Kia Corporation, Seoul (KR)

(72) Inventor: Hee Yun Lee, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/375,708

(22) Filed: Jul. 14, 2021

(65) Prior Publication Data

US 2022/0176938 A1 Jun. 9, 2022

(30) Foreign Application Priority Data

Dec. 9, 2020 (KR) .................. 10-2020-0170943

(51) Int. Cl.
| | |
|---|---|
| B67D 7/22 | (2010.01) |
| B60W 20/10 | (2016.01) |
| B60W 10/06 | (2006.01) |
| B60W 10/08 | (2006.01) |
| B60W 40/02 | (2006.01) |

(52) U.S. Cl.
CPC ............ *B60W 20/10* (2013.01); *B60W 10/06* (2013.01); *B60W 10/08* (2013.01); *B60W 40/02* (2013.01); *B60W 2510/244* (2013.01); *B60W 2520/10* (2013.01); *B60W 2520/12* (2013.01); *B60W 2556/60* (2020.02); *B60W 2710/0666* (2013.01); *B60W 2710/083* (2013.01)

(58) Field of Classification Search
CPC .................................. G06Q 20/18; G07F 7/00
See application file for complete search history.

(56) References Cited

U.S. PATENT DOCUMENTS

| | | | |
|---|---|---|---|
| 2014/0107835 A1* | 4/2014 | Biasi | B67D 1/0892 700/231 |
| 2016/0330825 A1* | 11/2016 | Recker | H05B 47/115 |
| 2017/0223807 A1* | 8/2017 | Recker | H02J 9/02 |

* cited by examiner

*Primary Examiner* — John Kwon
(74) *Attorney, Agent, or Firm* — Fox Rothschild LLP

(57) ABSTRACT

A power distribution control system of a vehicle includes a driving information provider for collecting and providing information required for power distribution control of an engine and a motor in the vehicle; a communication unit for transmitting the information provided by the driving information provider from the vehicle; a cloud server outside the vehicle for selecting and transmitting optimal power distribution control logic data corresponding to a driving situation of the vehicle based on the information provided through the communication unit from the vehicle; and a vehicle controller for performing power distribution control of the engine and the motor based on real-time driving state variable information of the vehicle using the optimal power distribution control logic data received through the communication unit by the vehicle from the cloud server.

20 Claims, 4 Drawing Sheets

SYSTEM AND METHOD OF CONTROLLING POWER DISTRIBUTION OF HYBRID ELECTRIC VEHICLE

CROSS-REFERENCE TO RELATED APPLICATION

This application claims under 35 U.S.C. § 119(a) the benefit of Korean Patent Application No. 10-2020-0170943 filed on Dec. 9, 2020, the entire contents of which are incorporated herein by reference.

BACKGROUND

(a) Technical Field

The present disclosure relates to a system and method of controlling power distribution of a hybrid electric vehicle, more particularly, to the system and method of controlling power distribution for optimizing power distribution for an engine and a motor of the hybrid electric vehicle based on driving data and improving fuel efficiency.

(b) Description of the Related Art

A hybrid electric vehicle refers to a vehicle using two different types of driving sources and generally refers to a vehicle that is driven using an engine for obtaining rotation power by burning fuel and a motor for obtaining rotation power from power of a battery.

As a type of a general powertrain of a hybrid electric vehicle, a transmission mounted electric device (TMED)-type hybrid system in which an engine clutch is disposed between an engine and a motor is known. In the TMED-type hybrid system, the engine clutch connects the engine to the motor, and a transmission is connected to an output side of the motor.

An inverter for driving and controlling a motor is installed in a hybrid electric vehicle, and the motor is chargeably and dischargeably connected to a high-voltage main battery in the vehicle through the inverter. The inverter converts direct current (DC) supplied from the battery into alternating current (AC) and applies the converted AC to the motor through a power cable while the motor is driven, and converts AC generated by the motor into DC and supplies the converted DC to the battery during regeneration of the motor.

The hybrid electric vehicle includes a hybrid starter and generator (HSG) connected to the engine to transfer power thereto and for starting the engine or generating electricity using rotation power transferred from the engine. The HSG is also chargeably and dischargeably connected to the battery through a separate inverter.

In an electrically-driven (electrified) vehicle driven using a motor as well as a hybrid electric vehicle, for example, including an eco-friendly vehicle such as a pure electric vehicle or a fuel cell vehicle, a regenerative mode in which a battery is charged by recovering kinetic energy of a vehicle in the form of electric energy through power generation of a motor is executed during coasting or braking. In the electrically-driven vehicle, a function of a regenerative mode is indispensable in order to improve the efficiency and fuel efficiency of the vehicle.

The hybrid electric vehicle requires appropriate power distribution of an engine and a motor in order to improve fuel efficiency of a vehicle by minimizing fuel consumption. An energy management strategy that appropriately distributes and uses power of the engine and power of the motor depending on a driving situation of the vehicle is required to improve fuel efficiency.

In current mass-produced hybrid electric vehicles, a rule-based control strategy has been mainly used as an energy management strategy. In particular, each driving source is used in a high-efficiency region by turning on or off an engine and determining operation points of the engine and a motor according to a predetermined rule. In addition, fuel efficiency of a vehicle is improved by maximizing energy recovery due to regenerative brake and controlling a charging degree of a battery depending on a driving situation of the vehicle.

Research has been widely conducted into an optimization-based control strategy based on an optimization theory as well as the rule-based control strategy that is widely used in mass-produced hybrid electric vehicles, and optimization-based control strategies such as dynamic programming or equivalent consumption minimization strategy have been directly and indirectly used to determine and establish the rule-based control strategy of mass-produced vehicles.

However, a conventional rule-based control technology is configured based on heuristics, and thus there is a need for a technology for optimizing power distribution depending on a structure of a powertrain of a vehicle and a driving environment of the vehicle. A conventional optimization-based control technology has a problem in that it is difficult to use real-time vehicle control based on online optimization of load calculation. In addition, both the conventional rule-based and optimization-based control technologies have disadvantages in that it is impossible to statistically apply various driving situations of the vehicle.

SUMMARY

The present disclosure provides a system and method of controlling power distribution of a hybrid electric vehicle for optimizing power distribution of a vehicle based on driving data and improving fuel efficiency. In addition, the present disclosure provides a system and method of controlling power distribution for optimizing power distribution of a vehicle by statistically applying various driving situations of the vehicle.

The technical problems solved by the embodiments are not limited to the above technical problems and other technical problems which are not described herein will become apparent to those skilled in the art from the following description.

In a preferred embodiment, a power distribution control system of a vehicle (e.g., a hybrid electric vehicle) includes a driving information provider configured to collect and provide information required for power distribution control of an engine and a motor in the vehicle, a communication unit configured to transmit the information provided by the driving information provider from the vehicle, a cloud server outside the vehicle, configured to select and transmit optimal power distribution control logic data corresponding to a driving situation of the vehicle based on the information provided through the communication unit from the vehicle, and a vehicle controller configured to perform power distribution control of the engine and the motor based on real-time driving state variable information of the vehicle using the optimal power distribution control logic data received through the communication unit by the vehicle from the cloud server.

In another preferred embodiment, a power distribution control method of a vehicle (e.g., a hybrid electric vehicle)

includes collecting and providing, by a driving information provider of the vehicle, information required for power distribution control of an engine and a motor, transmitting the information provided by the driving information provider from the vehicle through a communication unit, selecting and transmitting, by a cloud server outside the vehicle, optimal power distribution control logic data corresponding to a driving situation of the vehicle based on the information provided through the communication unit from the vehicle, and performing, by a vehicle controller of the vehicle, power distribution control of the engine and the motor based on real-time driving state variable information of the vehicle using the optimal power distribution control logic data received through the communication unit by the vehicle from the cloud server.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
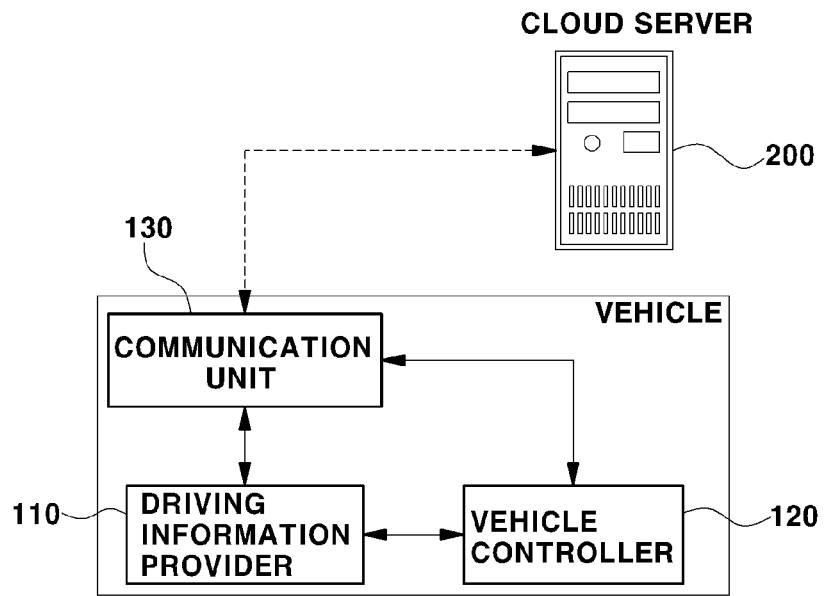
FIG. 1 is a schematic diagram showing the entire configuration of a power distribution control system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In exemplary embodiments of the present disclosure disclosed in the specification, specific structural and functional descriptions are merely illustrated for the purpose of illustrating embodiments of the invention and exemplary embodiments of the present disclosure may be embodied in many forms and are not limited to the embodiments set forth herein, and any changes, equivalents or alternatives which are within the spirit and scope of the present disclosure should be understood as falling within the scope of the invention.

It will be understood that although the terms first, second, etc. may be used herein to describe various elements, these elements should not be limited by these terms. These terms are only used to distinguish one element from another element. For example, a first element may be termed a second element and a second element may be termed a first element without departing from the teachings of the present disclosure.

It will be understood that when an element is referred to as being "connected to" or "coupled to" another element, it may be directly on, connected or coupled to the other element or intervening elements may be present. In contrast, when an element is referred to as being "directly connected to" or "directly coupled to" another element or layer, there are no intervening elements present.

The present disclosure relates to a system and method of controlling power distribution for an engine and a motor of a hybrid electric vehicle. In particular, the present disclosure provides a system and method of controlling power distribution of a hybrid electric vehicle for optimizing power distribution for an engine and a motor of a vehicle based on driving data and improving fuel efficiency of the vehicle. In addition, the present disclosure provides a system and method of controlling power distribution for optimizing power distribution of a vehicle by optimizing power distribution of a vehicle by statistically applying various driving situations of the vehicle.

The present disclosure proposes an optimization-based control technology learning various vehicle driving data of a driver based on a stochastic optimization theory and statistically improving fuel efficiency of the vehicle using based on the learned vehicle driving data.

FIG. 1 is a schematic diagram showing the entire configuration of a power distribution control system according to an embodiment of the present disclosure. As shown in FIG. 1, the power distribution control system according to an embodiment of the present disclosure may include a driving information provider 110, a vehicle controller 120, a communication unit 130, and a cloud server 200 outside the vehicle.

The driving information provider 110 may be included in the vehicle and may transmit setting information that is preset for power distribution control by the vehicle and information that is collected by the vehicle while traveling. The driving information provider 110 may transmit driving situation information including GPS position information, vehicle identification information, driver information, and time information, and information on driving data including speed profile information and torque profile information of the vehicle to the cloud server 200 through the communication unit 130.

The driving situation information may be information that is transmitted in real time to the cloud server 200 by the driving information provider 110. The GPS position information of the driving situation information may be information indicating the current position of the vehicle and may be position information for checking a driving road on which the vehicle currently travels.

The GPS position information may be real-time vehicle position information obtained from a GPS signal received by the vehicle through a GPS receiver (not shown). When a traveling vehicle acquires the GPS position information, the acquired GPS position information may be transmitted to the cloud server 200 from the driving information provider 110 in real time.

The vehicle identification information and driver information of the driving situation information may be preset setting information, the vehicle identification information may include information on a vehicle type (vehicle model) and a powertrain, and the driver information may be driver identification information for identifying a vehicle driver and may include driver tendency information of a driver in addition to driver identification ID set by the driver. The time information may be information on the time at which the driving situation information such as GPS position information is collected.

The information on driving data may be driving information that is periodically transmitted to the cloud server 200 from the driving information provider 110 and may be information indicating vehicle speed and vehicle driving torque, which are collected for a time corresponding to a predetermined period while the vehicle travels, in the form of a continuous data profile. As provided herein, torque information may be wheel torque profile information that is driving torque information at a wheel of a vehicle. The torque information may be profile information of a torque value corresponding to a torque command of a vehicle driving device, that is, the sum of an engine torque command and a motor torque command.

As such, the driving information provider 110 of the vehicle may transmit the driving situation information including the GPS position information, the vehicle identification information, the driver information, and the time information, and the information on driving data including the speed profile information and the torque profile information of the vehicle to the cloud server 200, and the cloud server 200 may classify the information transmitted from the driving information provider 110.

Thus, the cloud server 200 may select optimal power distribution control logic data corresponding to the current driving environment based on the driving situation information of the vehicle, which is received from the driving information provider 110 in real time, from the optimal power distribution control logic data classified based on the driving situation information, and may transmit the selected optimal power distribution control logic data to the vehicle. As provided herein, the optimal power distribution control logic data may include lookup table data.

Thus, the vehicle controller 120 may control the vehicle using the optimal power distribution control logic data (lookup table data) received from the cloud server 200 through the communication unit 130. In this case, the vehicle controller 120 may control power distribution for an engine and a motor of a control target vehicle, i.e., a hybrid electric vehicle using the optimal power distribution control logic data.

The communication unit 130 may be included in the vehicle for wireless communication between the vehicle and the cloud server 200. That is, the communication unit 130 may be a communication device for the vehicle, and may be used for wireless communication between the driving information provider 110 of the vehicle and the cloud server 200 that is a system outside the vehicle, and wireless communication between the vehicle controller 120 and the cloud server 200.

The cloud server 200 may classify the information on driving data, that is, the speed profile information and the torque profile information of the vehicle, which is periodically transmitted from the driving information provider 110, based on the vehicle driving situation information (GPS position information, vehicle identification information, driver information, and time information) which is currently received information, and may configure a vehicle driving data probability model for each driving situation (driving environment) using the classified information. The cloud server 200 may optimize power distribution control logic of the hybrid electric vehicle using the vehicle driving data probability model for each driving situation.

Figure 2:
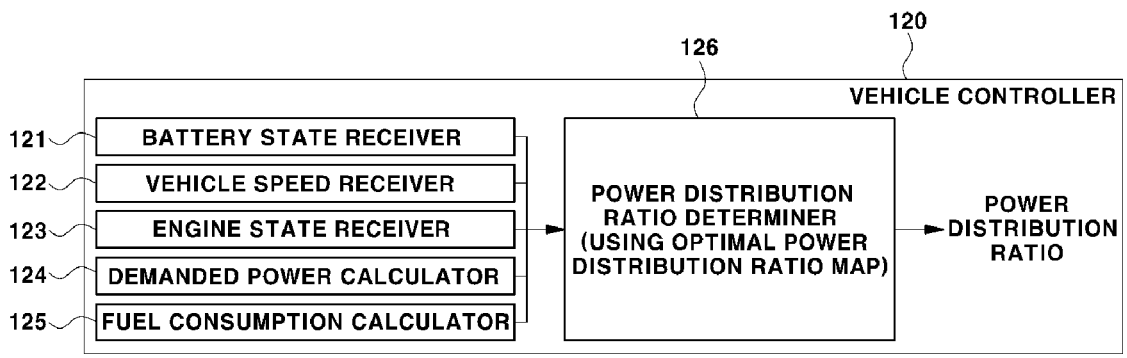
FIG. 2 is a block diagram showing an example of the configuration of a vehicle controller related to power distribution according to an embodiment of the present disclosure.

The vehicle controller 120 may be a high-ranking controller of the hybrid electric vehicle and may also function as a high-ranking controller in power distribution. FIG. 2 is a block diagram showing an example of the configuration of the vehicle controller 120 related to power distribution according to an embodiment of the present disclosure. As shown in FIG. 2, the vehicle controller 120 may include a battery state receiver 121, a vehicle speed receiver 122, an engine state receiver 123, a demanded power calculator 124, a fuel consumption calculator 125, and a power distribution ratio determiner 126.

The battery state receiver 121 may receive information on a battery state of charge (SOC) that is information on the remaining power of the battery state information from a battery management system (BMS). The vehicle speed receiver 122 may receive information on the current vehicle speed detected by a sensor, and the engine state receiver 123 may receive information on the current On/Off state of the engine.

The demanded power calculator 124 may calculate a vehicular demanded power amount from an accelerator pedal input value, a current vehicle speed, and the like of the driver. The accelerator pedal input value may be detected by an accelerator position sensor (APS), and the APS may output an electrical signal based on an accelerator pedal manipulation state of the driver.

The fuel consumption calculator 125 may calculate an hourly fuel consumption of the engine in an engine On-state. The power distribution ratio determiner 126 may have a preset optimal power distribution ratio map, may determine an optimal power distribution ratio using the optimal power distribution ratio map from the battery SOC, the current vehicle speed, the engine On/Off state, the demanded power amount, and the fuel consumption information, which are the real-time driving state variable information of the vehicle received or calculated as described above, and may transmit the determined optimal power distribution ratio to a motor controller and an engine controller which are low-ranking controllers.

According to an embodiment of the present disclosure, the demanded power amount, the vehicle speed, and the battery SOC may be determined as a value obtained by discretizing a signal that is obtained in real time by the vehicle controller 120 while the vehicle travels using a nearest neighbor method according to the following expressions.

$$P_{dem} \in \{P_{dem}^1, P_{dem}^2, \ldots, P_{dem}^{N_P}\}, v \in \{v^1, v^2, \ldots, v^{N_v}\},$$

$$SOC \in \{soc^1, soc^2, \ldots soc^{N_v}\} \quad (1)$$

As provided herein, $P_{dem}$ is a vehicular demanded power amount, v is a vehicle speed, and SOC is a battery SOC.

The vehicular demanded power amount may be determined from vehicle driving information such as a current accelerator pedal input value (APS value) and a vehicle speed and a preset vehicle parameter setting value according to the following expressions.

$$P_{dem} = v \cdot (F_{loss} + F_{accel}), F_{accel} = (M_{veh} + I_{eq}) \cdot a_{veh},$$

$$F_{loss} = f_0 + f_1 \times v + f_2 \times v^2 \quad (2)$$

As provided herein, $F_{loss}$ and $F_{accel}$ are vehicle driving load and vehicle accelerating force, $M_{veh}$ is a vehicle weight, $I_{eq}$ is an equivalent weight of a vehicle rotational inertia element including a powertrain, and $a_{veh}$ is a vehicle acceleration. In addition, $f_0$, $f_1$, and $f_2$ are vehicle driving load coefficients.

Figure 3:
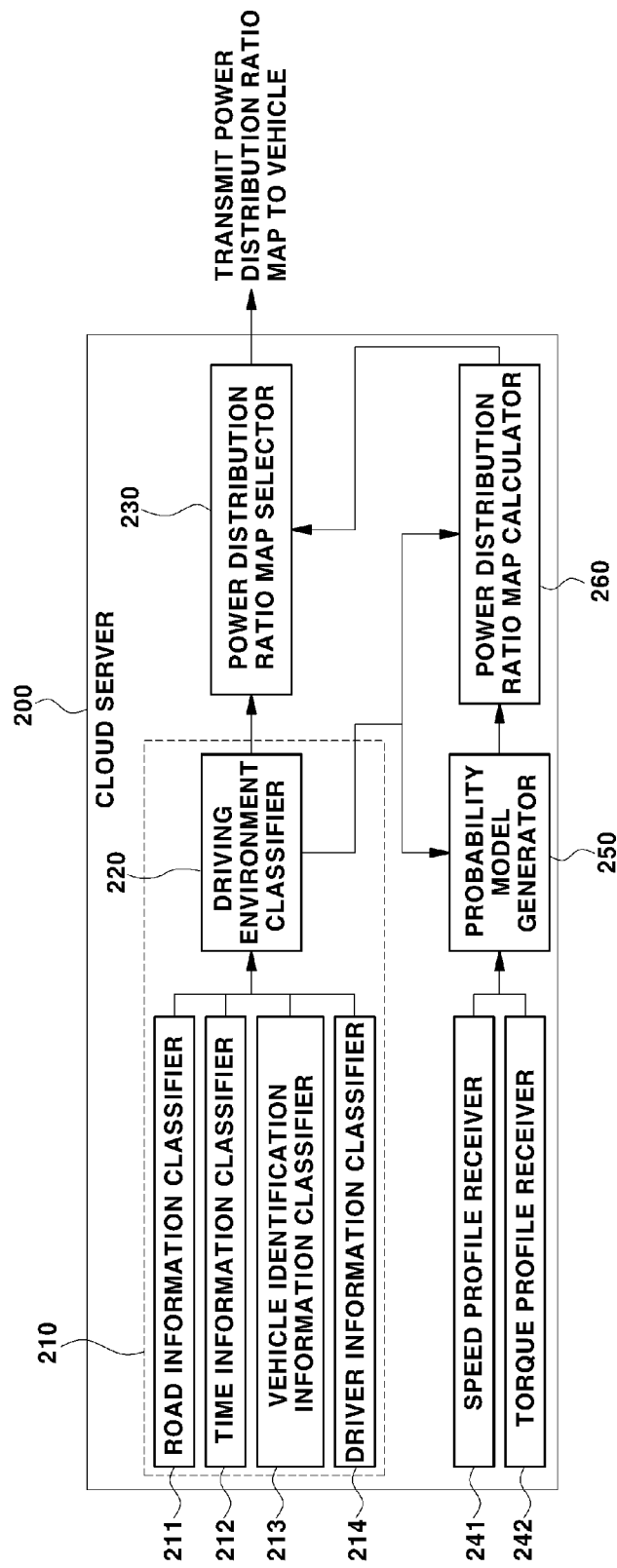
FIG. 3 is a block diagram showing an example of the configuration of a cloud server according to an embodiment of the present disclosure.

FIG. 3 is a block diagram showing an example of the configuration of the cloud server 200 according to an embodiment of the present disclosure. As shown in FIG. 3, the cloud server 200 may include a classification unit 210 for receiving and classifying information transmitted from a vehicle, that is, the driving situation information and the information on driving data transmitted from the driving information provider 110.

The classification unit 210 may include a road information classifier 211 for checking and classifying a road on which a vehicle travels from the GPS position information of the driving situation information transmitted from the driving information provider 110, and a time information classifier 212, a vehicle identification information classifier 213, and a driver information classifier 214, which respectively classify time information (information on the time at which GPS position information is collected), vehicle identification information, and driver information, which are driving situation information.

In addition, the classification unit 210 may further include a driving environment classifier 220 for finally specifying the current driving environment based on the information classified by the road information classifier 211, the time information classifier 212, the vehicle identification information classifier 213, and the driver information classifier 214.

An example of the information specified by the driving environment classifier 220 will be described below.
Road information classification: Road between○Interchange (IC) and○IC of○○ Expressway
Time information classification: 8 AM-10 AM
Vehicle identification information classification: XX1 2.0 HEV
Driver information classification: XX2, Tendency of abrupt acceleration and deceleration As provided herein, XX1 indicates a vehicle model name, and XX2 indicates a driver identification ID.

The cloud server 200 may further include a power distribution data selector for selecting optimal power distribution control logic data corresponding to the specified current driving environment and transmitting the same to the vehicle based on the current driving environment information determined by the classification unit 210, in more detail, the current driving environment information that is finally specified by the driving environment classifier 220.

The optimal power distribution control logic data may be an optimal power distribution ratio map, and the power distribution data selector may be a power distribution ratio map selector 230 for selecting the optimal power distribution ratio map and transmitting the same to the vehicle.

The cloud server 200 may further include a speed profile receiver 241 and a torque profile receiver 242 that respectively receive speed profile information and wheel torque profile information of the vehicle, which are periodically transmitted from the driving information provider 110.

The cloud server 200 may further include a probability model generator 250 for generating a driving environment probability model using the speed profile information and the wheel torque profile information of the vehicle, which are periodically received through the speed profile receiver 241 and the torque profile receiver 242, respectively.

In addition, the cloud server 200 may further include a power distribution ratio map calculator 260 for calculating an optimal power distribution ratio map value using the driving environment probability model generated by the probability model generator 250 and the driving environment information provided by the classification unit 210, updating a power distribution ratio map using the calculation result, and providing the updated power distribution ratio map to the power distribution ratio map selector 230.

Figure 4:
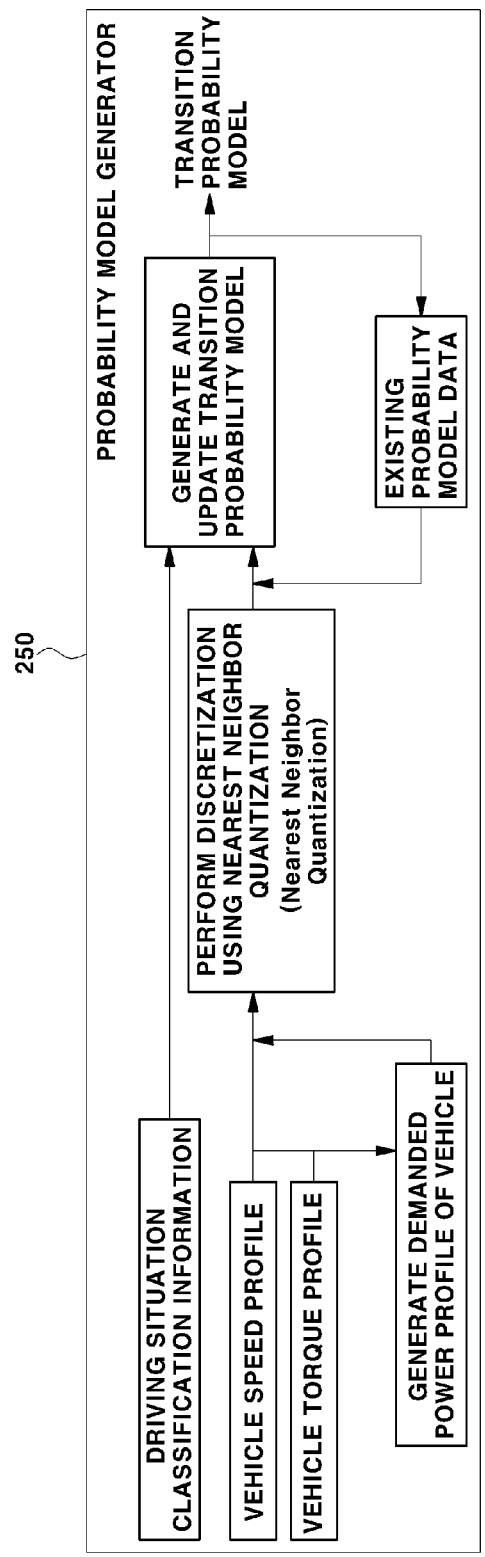
FIG. 4 is a block diagram showing an example of the configuration of a probability model generator of a cloud server according to an embodiment of the present disclosure.

FIG. 4 is a block diagram showing an example of the configuration of the probability model generator 250 of the cloud server 200 according to an embodiment of the present disclosure. As described above, the probability model generator 250 may generate a transition probability model as the vehicle driving data probability model based on the speed profile information and the wheel torque profile information of the vehicle.

To this end, the probability model generator 250 may generate a demanded power ($P_{dem}$) profile of the vehicle using the speed profile and torque profile information of the vehicle and may then perform discretization on the speed (v) profile information and the demanded power profile using a nearest neighbor quantization method.

The probability model generator 250 may generate a transition probability model from the demanded power profile and the speed profile, which are obtained by performing discretization, using a maximum likelihood estimator.

The transition probability model may be used to acquire a probability of changing demanded power and speed in step t to demanded power and speed in next step t+1 and may be represented according to the following expressions.

$$Pr\{P_{dem}^j, v^k \mid P_{dem} = P_{dem}^i, v = v^l\} = \hat{P}_{il,jk} \quad (3)$$

for $i, j = 1, 2, \ldots, N_p, l, k = 1, 2, \ldots, N_v$ $\hat{P}_{il,jk} = \dfrac{m_{il,jk}}{m_{il}}$ if $m_{ij} \neq 0$, $m_{il,jk}$: the number of times that the transition from $P_{dem}^i$, $v^l$ to $P_{dem}^j, v_k$ In the transition probability model, existing probability model data may be updated using new data and a preset ratio of learning a according to the following expression.

$$\text{TPM} \leftarrow (1-\alpha)\text{TPM}_{old\_data} + \alpha\text{TPM}_{new\_data} \quad (4)$$

As provided herein, TPM indicates probability model data, $\text{TPM}_{old\_data}$ indicates existing probability model data, and $\text{TPM}_{old\_data}$ indicates new data. Expression (4) indicates that the probability model data of the transition probability model is updated to $(1-\alpha)\text{TPM}_{old\_data} + \alpha\text{TPM}_{new\_data}$.

The aforementioned generated driving environment probability model may be a probability model based on the driving environment classified by the driving environment classifier 220 and may indicate the characteristics of each driving environment. According to the present disclosure, the power distribution ratio map may be optimized using the model, and the optimized power distribution ratio map may be transmitted to the vehicle. Finally, in the vehicle, the vehicle controller 120 may use control logic optimized for each driving environment, and accordingly, fuel efficiency of the vehicle may be improved using the control logic optimized for each driving environment.

Figure 5:
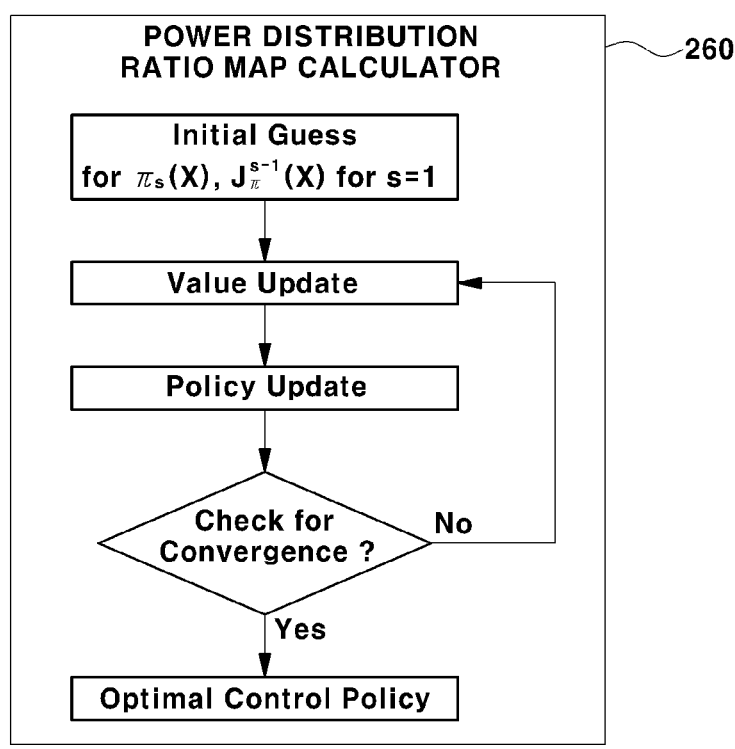
FIG. 5 is a flowchart showing a procedure of calculating an optimal power distribution ratio map, which is performed by a power distribution ratio map calculator of a cloud server, according to an embodiment of the present disclosure.

FIG. 5 is a flowchart showing a procedure of calculating an optimal power distribution ratio map, which is performed by the power distribution ratio map calculator 260 of the cloud server 200, according to an embodiment of the present disclosure. The power distribution ratio map calculator 260 may calculate an optimal power distribution ratio map value using a transition probability model.

According to the present disclosure, in calculation of the optimal power distribution ratio map value, optimization may be performed using a vehicle model based on a stochastic optimization theory. As provided herein, optimization may be defined according to Expression (5) below.

$$\text{minimize } J_\pi(x_0) = \lim_{N \to \infty} E\left\{\sum_{k=0}^{N-1} \gamma^k g(x_k, \pi(x_k))\right\} \quad (5)$$

In Expression (5) above, $x_k$ indicates a state variable of a vehicle model, and state variable $x_k = [SOC_k, P_{dem,k}, v_k, E_{on,k}]$. That is, the state variable may be defined using the battery SOC ($SOC_k$), a demanded power amount ($P_{dem,k}$), a vehicle speed ($v_k$), and an engine on/off signal ($E_{on,k}$). In addition, in Expression (5) above, $\gamma$ indicates a discount factor.

$J_\pi(x_0)$ indicates an expected cost that is acquired when a vehicle system follows control policy $\pi$ from state variable $x_0$. g indicates a cost.

Cost g may be given as the sum of instantaneous fuel consumption $W_{fuel}$, a penalty value for an event in which an engine is turned off and on, and a penalty value for an SOC variation, which is represented according to the following expression.

$$g = W_{fuel} + \beta \cdot \Delta E_{on} + \zeta(SOC_{ref} - SoC)^2 \quad (6)$$

As provided herein, $\beta$ and $\zeta$ are factors (coefficients) for a penalty.

The procedure of calculating the optimal power distribution ratio map may broadly include an operation of value update of an expected value and an operation of policy update (policy improvement) of a control policy.

In this case, in the operation of value update of the expected value, expected value $J_\pi(x_k)$ of each state variable may be obtained via repeated calculation using a given control policy according to the following expression.

$$J_\pi^{S+1}(x^i) = g(x^i, \pi(x^i)) + E_d\{\gamma J_\pi^S(x')\} \quad (7)$$

In the operation of policy update of the control policy, improved control policy $\pi'(x_k)$ may be derived using expected value $J_\pi(x_k)$ of each given state variable according to Expression (8) below.

$$\pi'(x^i) = \underset{u \in U(x^i)}{\text{argmin}}\left[g(x^i, u) + E_d\{\gamma J_\pi(x')\}\right] \quad (8)$$

The operation of value update of the expected value and the operation of policy update of the control policy may be repeatedly performed until converging to an optimal control policy. The optimal control policy (power distribution ratio map) as the result of such operations may be provided in a form of a lookup table ($u(SOC, P_{dem}, v, E_{on})$), and may indicate engine power depending on state variable $x_k = [SOC_k, P_{dem,k}, v_k, E_{on,k}]$ so as to be used in real time by the vehicle controller 120.

Thus far, the power distribution control system and method according to an embodiment of the present disclosure have been described in detail. The present disclosure relates to a technology of optimizing and controlling power distribution of a hybrid electric vehicle based on driving data, in which case information on driving situation and driving data is collected by the cloud server 200, a control policy is transmitted again back to the vehicle after being optimized in an offline state using the data collected by the cloud server 200, and the optimized and obtained control policy is used to control power distribution in the vehicle controller 120.

The cloud server 200 may generate a transition probability model using information on driving data obtained while a vehicle travels, that is, a speed profile and a torque profile of the vehicle, and may perform optimization using the transition probability model. According to the present disclosure, a driving data model formed based on information classified based on various driving situations of a vehicle (a driving road, a time, vehicle identification information such as a vehicle type and a powertrain type, and driver information such as driving tendency) may be embodied to indicate characteristics for the respective driving situations.

The cloud server 200 may be capable of acquiring a power distribution ratio map optimized for each driving situation by classifying driving data depending on characteristics for respective driving situations and then optimizing the power distribution ratio map to be used by the vehicle controller 120 based on the classified information. The acquired power distribution ratio map may be optimized using a probability model classified based on data indicating driving tendency of a driver, and thus it may be possible to obtain a driver-customized power distribution ratio map.

Accordingly, the system and method of controlling power distribution of a hybrid electric vehicle according to the present disclosure may be a control system and method for determining an optimal power distribution ratio of a hybrid electric vehicle based on driving information of a vehicle and may provide an effect of significantly improving fuel efficiency. That is, the present disclosure may provide a power distribution control strategy of a hybrid electric vehicle based on a stochastic optimization theory, and thus may improve fuel efficiency compared with a conventional rule-based hybrid control strategy. As seen from a simulation verification result, fuel efficiency may be significantly improved compared with a conventional rule-based logic, and when power distribution is optimized using driving information collected from a vehicle, fuel efficiency may be further improved.

According to the present disclosure, driving environmental characteristics such as driving road or congestion may be optimized and applied to a vehicle controller by configuring and optimizing a probability model based on an actual driving speed profile and torque profile data of a vehicle. In addition, according to the present disclosure, optimized control logic may be configured through learning based on a driving environment (driving speed profile) for various drivers, and thus it may be possible to develop driver-customized hybrid power distribution control logic to which the characteristics of a driver, such as abrupt acceleration or abrupt deceleration, are applied.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A power distribution control system of a vehicle, comprising:
   a driving information provider configured to collect and provide information required for power distribution control of an engine and a motor in the vehicle;
   a communication unit configured to transmit the information provided by the driving information provider from the vehicle;
   a cloud server remote from the vehicle, configured to select and transmit optimal power distribution control logic data corresponding to a driving situation of the vehicle based on the information provided through the communication unit from the vehicle; and
   a vehicle controller configured to perform power distribution control of the engine and the motor based on real-time driving state variable information of the vehicle using the optimal power distribution control logic data received through the communication unit by the vehicle from the cloud server.

2. The power distribution control system of claim 1, wherein the information collected and provided for power distribution control by the driving information provider comprises:
   driving situation information comprising GPS position information, vehicle identification information, driver information, and time information, received through a GPS receiver of the vehicle; and
   information on driving data comprising speed profile and torque profile information of the vehicle.

3. The power distribution control system of claim 2, wherein the vehicle identification information comprises information on a vehicle type and a power train of the vehicle;
   wherein the driver information comprises a driver identification for identifying a vehicle driver and driver tendency information of the driver; and
   wherein the time information of the driving situation information includes a time at which the driving situation information is collected by the driving information provider.

4. The power distribution control system of claim 2, wherein the speed profile and the torque profile are transmitted to the cloud server from the driving information provider in a predetermined period and comprise vehicle speed and vehicle driving torque information collected during the predetermined period while the vehicle travels.

5. The power distribution control system of claim 2, wherein the cloud server comprises:
   a classification unit configured to receive and classify the driving situation information transmitted through the communication unit from the vehicle and to determine a current driving environment based on the classified information; and
   a power distribution data selector configured to select optimal power distribution control logic data corresponding to the current driving environment determined by the classification unit.

6. The power distribution control system of claim 5, wherein the optimal power distribution control logic data comprises an optimal power distribution ratio map set to determine a power distribution ratio for the engine and the motor using the real-time driving state variable information of the vehicle as an input; and
   wherein the power distribution data selector is configured to select the optimal power distribution ratio map corresponding to the current driving environment.

7. The power distribution control system of claim 6, wherein the vehicle controller receives the optimal power distribution ratio map selected and transmitted by the power distribution ratio map selector of the cloud server, and performs power distribution control for the engine and the motor according to the power distribution ratio determined by the received optimal power distribution ratio map.

8. The power distribution control system of claim 6, wherein the cloud server further comprises:
   a speed profile receiver configured to receive speed profile information transmitted through the communication unit from the vehicle;
   a torque profile receiver configured to receive torque profile information transmitted through the communication unit from the vehicle;
   a probability model generator configured to generate a driving environment probability model using the speed profile information and the torque profile information of the vehicle, received through the speed profile receiver and the torque profile receiver; and
   a power distribution ratio map calculator configured to calculate an optimal power distribution ratio map value using the driving environment probability model generated by the probability model generator and driving environment information, to update an optimal power distribution ratio map using the calculated map value, and to provide the updated optimal power distribution ratio map.

9. The power distribution control system of claim 8, wherein the probability model generator generates a demanded power profile of the vehicle using the speed profile information and the torque profile information of the vehicle, performs discretization on the speed profile information and the demanded power profile using a nearest neighbor quantization method, and then generates a transition probability model that is the driving environment probability model from the demanded power profile and speed profile obtained by performing discretization using a maximum likelihood estimator.

10. The power distribution control system of claim 8, wherein the power distribution ratio map calculator calculates the optimal power distribution ratio map value using the driving environment probability model, and a state of charge (SOC) of a battery, a vehicle speed, an engine On/Off state, a vehicular demanded power amount, and hourly fuel consumption of the engine, which are state variables of a vehicle model.

11. The power distribution control system of claim 5, wherein the classification unit comprises:
a road information classifier configured to classify information on a road on which the vehicle travels from GPS position information indicating a position of the vehicle among the received driving situation information;
a time information classifier configured to classify information on a time, at which the GPS position information is collected, of the received driving situation information;
a vehicle identification information classifier configured to classify vehicle identification information of the received driving situation information;
a driver information classifier configured to classify driver information of the received driving situation information; and
a driving environment classifier configured to determine the current driving environment based on the information classified by the road information classifier, the time information classifier, the vehicle identification information classifier, and the driver information classifier.

12. The power distribution control system of claim 1, wherein the optimal power distribution control logic data comprises an optimal power distribution ratio map set to determine a power distribution ratio for the engine and the motor using the real-time driving state variable information of the vehicle as an input; and
wherein the vehicle controller performs power distribution control on the engine and the motor according to the power distribution ratio determined by the optimal power distribution ratio map.

13. The power distribution control system of claim 12, wherein the real-time driving state variable information of the vehicle comprises a state of charge (SOC) of a battery, a vehicle speed, an engine On/Off state, a vehicular demanded power amount, and an hourly fuel consumption of the engine.

14. A power distribution control method of a vehicle, the method comprising:
collecting and providing, by a driving information provider of the vehicle, information required for power distribution control for an engine and a motor;
transmitting the information provided by the driving information provider from the vehicle through a communication unit;
selecting and transmitting, by a cloud server remote from the vehicle, optimal power distribution control logic data corresponding to a driving situation of the vehicle based on the information provided through the communication unit from the vehicle; and
performing, by a vehicle controller of the vehicle, power distribution control of the engine and the motor based on real-time driving state variable information of the vehicle using the optimal power distribution control logic data received through the communication unit by the vehicle from the cloud server.

15. The method of claim 14, wherein the information collected and provided for power distribution control by the driving information provider comprises:
driving situation information comprising GPS position information, vehicle identification information, driver information, and time information, received through a GPS receiver of the vehicle; and
information on driving data comprising speed profile and torque profile information of the vehicle.

16. The method of claim 14, wherein the cloud server comprises:
a classification unit configured to receive and classify the driving situation information of the information transmitted through the communication unit from the vehicle and to determine a current driving environment based on the classified information; and
a power distribution data selector configured to select optimal power distribution control logic data corresponding to the current driving environment determined by the classification unit.

17. The method of claim 16, wherein the optimal power distribution control logic data comprises an optimal power distribution ratio map set to determine a power distribution ratio for the engine and the motor using the real-time driving state variable information of the vehicle as an input; and
wherein the power distribution data selector is a power distribution ratio map selector configured to select the optimal power distribution ratio map corresponding to the current driving environment.

18. The method of claim 16, wherein the cloud server further comprises:
a speed profile receiver configured to receive speed profile information as the information on driving data of the information transmitted through the communication unit from the vehicle;
a torque profile receiver configured to receive torque profile information as the information on driving data of the information transmitted through the communication unit from the vehicle;
a probability model generator configured to generate a driving environment probability model using the speed profile information and the torque profile information of the vehicle, received through the speed profile receiver and the torque profile receiver; and
a power distribution ratio map calculator configured to calculate an optimal power distribution ratio map value using the driving environment probability model generated by the probability model generator and driving environment information, to update an optimal power distribution ratio map using the calculated map value, and to provide the updated optimal power distribution ratio map.

19. The method of claim 18, wherein the probability model generator generates a demanded power profile of the vehicle using the speed profile information and the torque profile information of the vehicle, performs discretization on the speed profile information and the demanded power profile using a nearest neighbor quantization method, and then generates a transition probability model that is the driving environment probability model from the demanded power profile and speed profile obtained by performing discretization using a maximum likelihood estimator.

20. The method of claim 18, wherein the power distribution ratio map calculator calculates the optimal power distribution ratio map value using the driving environment probability model, and a state of charge (SOC) of a battery, a vehicle speed, an engine On/Off state, a vehicular demanded power amount, and hourly fuel consumption of the engine, which are state variables of a vehicle model.

* * * * *